May 13, 1924.
H. W. MILLER
AUTOMATIC WEIGHING MACHINE
Filed March 14, 1921  2 Sheets-Sheet 2
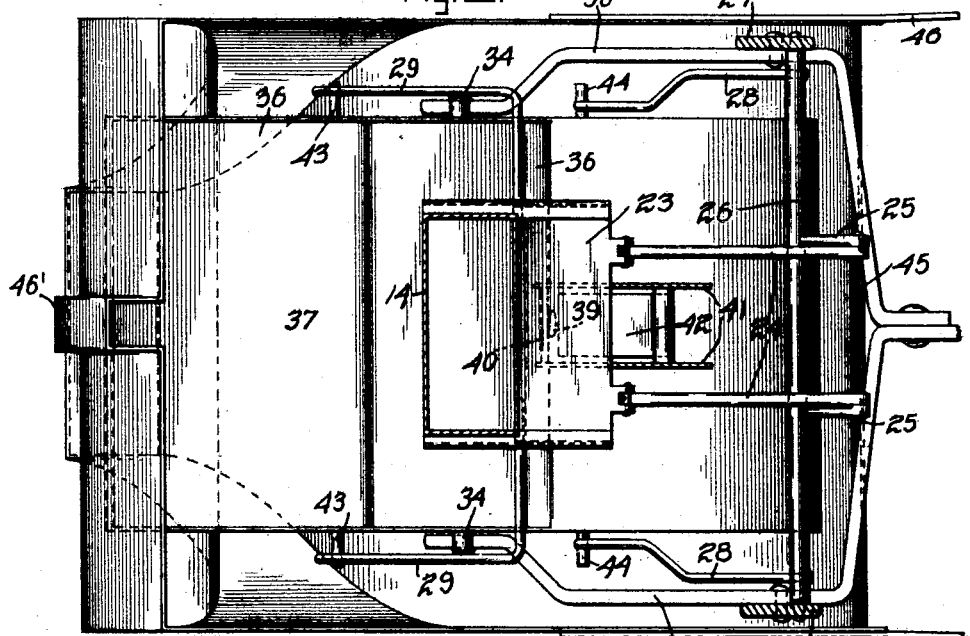
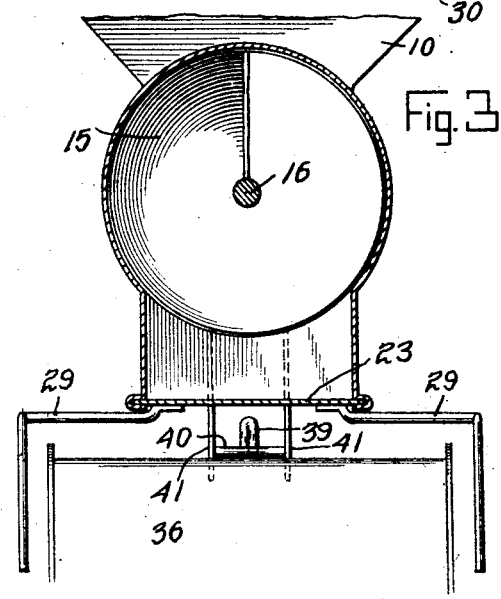
Inventor
Henry W. Miller
By *E. W. Bedford*
Attorney Patented May 13, 1924.

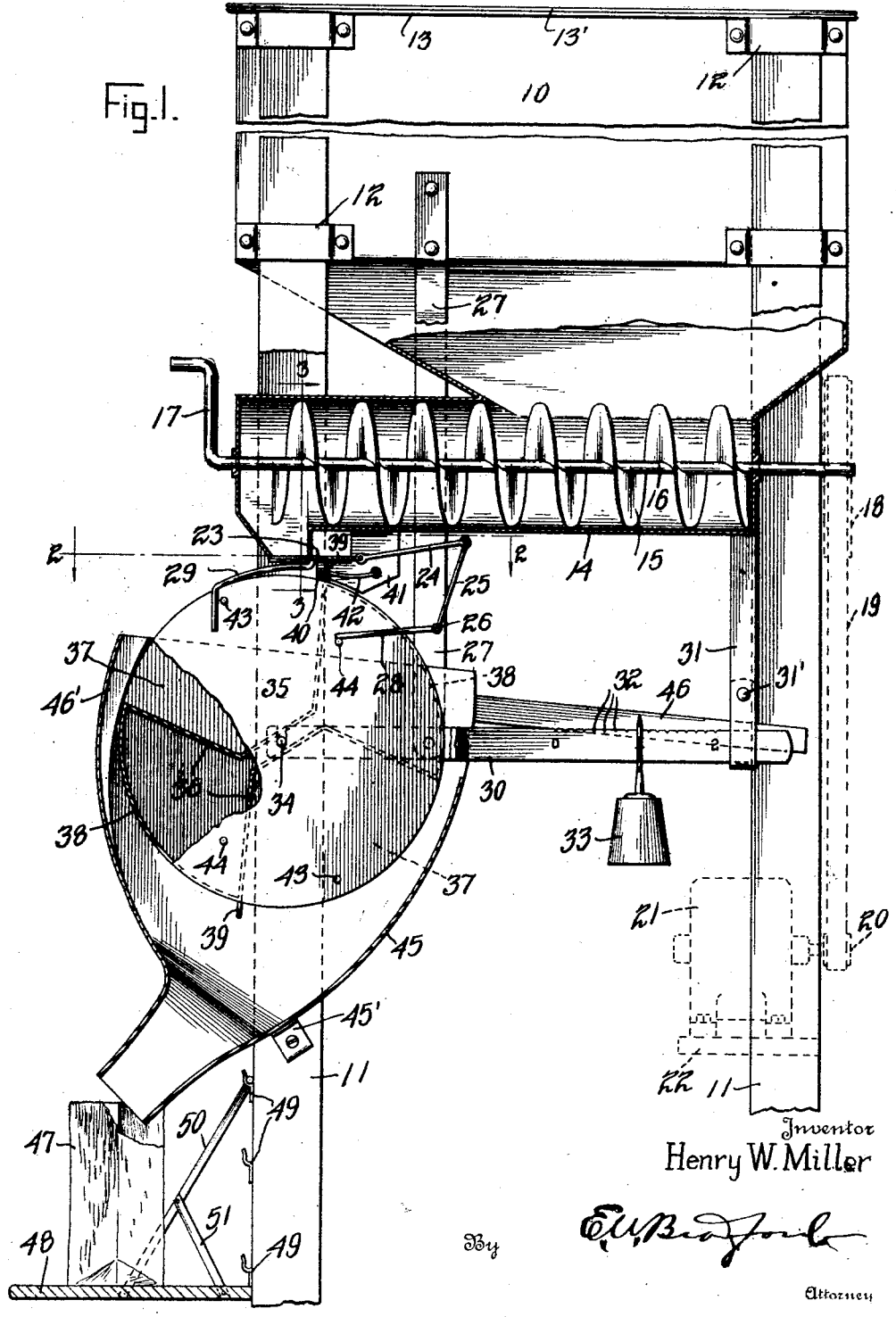

1,494,271

UNITED STATES PATENT OFFICE.

HENRY W. MILLER, OF MIAMI, FLORIDA.

AUTOMATIC WEIGHING MACHINE.

Application filed March 14, 1921. Serial No. 451,964.

*To all whom it may concern:*

Be it known that I, HENRY W. MILLER, a citizen of the United States, residing at Miami, in the county of Dade and State of Florida, have invented certain new and useful Improvements in Automatic Weighing Machines, of which the following is a specification.

My said invention relates to an automatic weighing machine by means of which I am enabled to weigh out equal portions of material in rapid succession with the use of very simple and inexpensive mechanism.

It is an object of my invention to provide a device of this sort which shall be inexpensive, simple in construction and at the same time uniform and reliable in operation.

A further object of my invention is to provide both manual and power operated means for running the machine whereby it may be operated either entirely by hand, if convenient to do so, or if power is available it may be operated thereby, in which case only a single attendant to place empty bags or other containers in position and remove and seal the filled ones will be required.

Referring to the accompanying drawings which are made a part hereof and on which similar reference characters indicate similar parts, Figure 1 indicates an elevation of my device with certain parts removed to show the operating mechanism clearly, Figure 2 is a horizontal section on line 2—2 of Figure 1, and Figure 3 is a vertical section on line 3—3 of Figure 1.

In the drawings reference character 10 indicates a hopper which may be supported by means of posts 11 removably engaging the sockets 12 on the hopper or by any other convenient frame work. As shown in the drawings flanges 13 on the hopper extend over the tops of the posts to limit downward movement thereof. A cover or lid 13′ is placed on the hopper to keep out dirt and flies, thereby keeping the contents in sanitary condition even if they remain therein for some time. Attached to the lower portion of the hopper is a housing 14 for a screw conveyor 15 supported on a shaft 16 and journaled in the end of the housing. This conveyor may be driven by a crank 17 or by a pulley 18 as desired. The pulley 18 is connected by a belt 19 to a pulley 20 on the shaft of an electric motor 21 supported on a shelf 22 attached to two of the posts 11. The specific hopper and the screw conveyor constitute a preferred mechanism for serving material to the weighing device but I do not limit myself in this respect as any other suitable container may be used in combination with other suitable means for controlling the discharge of the material therefrom.

At the front end of the housing 15 I have indicated a downward extension at the bottom of which is an opening controlled by a slidable gate or closure 23. This gate has attached to the rear end thereof a pair of links 24 which in turn are connected to rock arms 25 extending upward from a shaft 26. Journaled on supports 27 attached to opposite sides of the hopper is a second set of rock arms 28 extending from shaft 26 toward the front of the machine. A pair of bent fingers 29 are attached to the front of the sliding closure 23.

At the lower end of supports 27 there are a pair of pivots on which is supported for rocking motion a forked beam 30. At its rear end the beam is held against sidewise movement by a guide 31 which may be formed as shown by a flat rod attached to housing 14 and having its lower end bent over and riveted at 31′. Between the guide 31 and the pivotal point the beam 30 has notches and graduations at 32 which serve as weighing means in connection with a weight 33. Forwardly projecting forks on beam 30 have notches to receive pivots 34 projecting from the sides of a rotary dumping device 35. This dumping device, as illustrated, comprises a pair of disks and a pair of partitions 36 which provide oppositely arranged pockets 37 to receive material from the housing 14 when the closure 23 is opened. Segments 38 serve to close the space between the pockets 37, the segments extending across the space between the side disks and closing the peripheral openings between the pockets. The rigid attachment of partitions 36 and segments 38 along their edges to the side disks causes the entire dumping device to form a strong and compact structure. A pin 39 is supported at the rear of each pocket and may be mounted to project from the adjacent member 36 or may be integral therewith or if desired may be mounted on segments 38. These pins are adapted to abut successively against a stationary pin 40 supported on downward extensions 41 of the housing 14. A spring 42 mounted between the extensions prevents retrograde movement of the annular weighing member. The dumping device also carries oppositely-placed pins 43 and 44 whose functions are hereinafter described.

A casing 45 surrounds the major portion of member 35 and engages closely therewith at the front forming a partial closure for the pocket at that time being filled. This casing is supported at the bottom by bars 45′ connecting the same to the front posts 11, 11 and a pair of bars 46 also extends from the casing to the rear posts 11, 11. It has a narrow forward extension 46′ through which the pins 39 may move. At its lower portion the casing has a reduced portion forming a spout to convey material to a bag or other receiver as indicated at 47. The bag or other receiver is supported on a shelf 48 adjustably mounted on two posts 11 as by means of a series of brackets 49. A suspension member 50 is adapted to hook over any one of these brackets according to the size of the containers to be filled and the braces 51 extending between the shelf and the suspension member serve to hold them in the correct relative position.

Operation.

The weight 33 is set on the scale-beam in accordance with the amount of material by weight to be placed in each container, and the shelf 48 is also positioned according to the height of the container. Any material adapted to be dispensed by a machine of this type being then placed in the hopper 10, the conveyor 15 is turned by means of the crank 17 or by the operation of the motor indicated at 21 and the material is thus moved toward the front of the casing 14. Assuming the closure 23 to be open the material will pass into the opening until the pocket has received the desired amount of material, as determined by the position of the weight 25 on the scale-beam. When the desired weight of material has been received in the pocket the dump member 35 will cause beam 30 to tilt and the pin 39 will become disengaged from pin 40. As the major portion of the pocket is in a position forward of the pivot 34 the weight of material will tend to turn the dump toward the front of the machine. Thereupon oppositely placed pins 43 on the member 35 will engage the fingers 29 and move the closure 23 forward to close the feed opening. It will be seen that the close fit of the casing 45 at the front of the pocket will enable the pocket to be filled nearly to its greatest capacity if the material is light or if a large quantity is to be placed in each container 47. This construction also prevents premature dumping of the charge, and insures sufficient momentum of the dumping device to carry the next pocket into receiveing position. As the member 35 continues to rotate the material in the full pocket will be dumped into the lower portion of casing 45 and escape by the spout into container 47. By the time that the filled pocket is empty or sufficiently so to permit the beam 30 to tilt back to the position shown in the drawings the second pin 39 will have engaged the spring 42 and will then move into the position shown in the drawings where it engages pin 40 and so prevents further rotation of the dump 35. At the same time pins 44 on the carrier will have engaged rock arms 28 and elevated them to again open the closure 23 through the action of shaft 26, rock arms 25 and links 24 attached to the rear end of the closure.

Various modifications in the form and arrangement of parts of my device will occur to those skilled in the art and I do not therefore limit myself to what is shown in the drawings and described in the specification, the true scope of the invention being indicated in the appended claims.

Having thus fully described my said invention, what I claim as new and desire to secure by Letters Patent, is:

1. In a weighing machine, a weighing beam having graduations adjacent one end thereof, means for guiding the same for vertical movement, a weight co-acting with said graduations, a rotary measuring member at the opposite end having pockets, means for holding it against rotation until a predetermined amount of material has been served into one of the pockets, a horizontally movable gate for interrupting the feed when such predetermined amount has been served and means operable by the rotation of the measuring member to close the gate, substantially as set forth.

2. In a weighing machine, a rotary measuring device having pockets, a pivoted beam supporting said device, adjustable counterbalancing means for said rotary device located on the beam, and means for intermittently serving material into said box comprising a slidable gate and means controlled by the rotation of said measuring device for opening and closing the gate, substantially as set forth.

3. In a weighing machine, a rotary device having partitions forming pockets, spaced pins on said partitions projecting radially from said device, a fixed pin adapted to engage said spaced pins in succession and means to abut against the rear side of the pin so engaged to prevent retrograde movement of the rotary member, substantially as set forth.

4. In a weighing machine, a container for material to be weighed having an opening at the bottom thereof, a gate for said opening, a gravity controlled measuring device to receive material from said container, and means operated by the rotation of said measuring device for opening and closing the gate, substantially as set forth.

5. In a weighing machine, a rotary device having spaced pockets, pins projecting from said device at the rear side of the respective pockets, a fixed pin on the frame of the machine adapted to engage said projecting pins and a leaf spring adapted to rest against the pin so engaged to prevent retrograde movement of the rotary member, substantially as set forth.

6. In a weighing machine, a container for material to be weighed having an opening at the bottom thereof, a gate for said opening, a gravity controlled measuring device to receive material from said container, means operated by said measuring device for opening and closing the gate, and means for varying the operation of the gate in accordance with the desired increments of material, substantially as set forth.

7. In a weighing machine, a rotary measuring and dumping member, means for feeding material thereto including an opening and a gate therefor, and means operated by the rotary member for opening and closing said gate, substantially as set forth.

8. In a weighing machine, a rotary measuring and dumping member, means for feeding material thereto including an opening, and a gate therefor, and means operated by the rotary member for opening and closing said gate comprising pins projecting from the rotary member and connections therefrom to move the gate to and fro, substantially as set forth.

9. In a weighing machine, a rotary measuring and dumping member, means for feeding material thereto including an opening, and a sliding gate therefor, and means operated by the rotary member for opening and closing said gate comprising bent fingers on the gate and pins on the rotary member to engage said fingers to close the gate, substantially as set forth.

10. In a weighing machine, a rotary measuring and dumping member, means for feeding material thereto including an opening and a sliding gate therefor, and means operated by the rotary member for opening and closing said gate comprising pins on the rotary member and means connected to the rear of the gate and operable by the pins to open the gate, substantially as set forth.

11. In a weighing machine, a rotary measuring and dumping member, means for feeding material thereto including an opening, and a sliding gate therefor, and means operated by the rotary member for opening and closing said gate, comprising bent fingers on the gate, pins on the rotary member some of said pins co-acting with the fingers to close the gate, and means also connected to the gate and adapted for operation by some of said pins for opening the gate, substantially as set forth.

12. In a weighing machine, a rotary member having also a movement of translation, means adjustable in accordance with the desired weight of portions of material for holding the same in receiving position, means to hold the same against rotation while in said position, means operated by rotation of the member to close the gate when a full charge has been received, and means also operated by rotation of said member to open the gate after dumping of the charge, substantially as set forth.

13. In a weighing machine, a rotary member having pockets, said member having also a movement of translation, means adjustable in accordance with the desired weight of portions of material for holding the same in receiving position, means to hold the same against rotation while in said position, means operated by rotation of the member to close the gate when a pocket has been filled to a predetermined extent, and means also operated by rotation of said member to open the gate as an empty pocket comes into receiving position, substantially as set forth.

14. In a weighing machine, an upright support, a spout and adjustable means for supporting a container in receiving position relative thereto comprising a shelf adapted to rest against said support, a suspension member attached thereto, and a series of hooks on said support for selective engagement by said suspension member whereby the shelf may be positioned in accordance with the size of the container, substantially as set forth.

In witness whereof, I have hereunto set my hand and seal at Washington, District of Columbia, this eleventh day of March, A. D. nineteen hundred and twenty-one.

HENRY W. MILLER. [L. S.]

Witnesses:
FRANK W. DAHN,
MARIE A. SHAW.